United States Patent [19]

Kim

[11] Patent Number: 5,823,587
[45] Date of Patent: Oct. 20, 1998

[54] BUMPER SYSTEM FOR VEHICLES HAVING BUMPER SUPPORTERS

[75] Inventor: Sungjai Kim, Kyungsangnam-do, Rep. of Korea

[73] Assignee: Hyundai Motor Company, Seoul, Rep. of Korea

[21] Appl. No.: 763,456

[22] Filed: Dec. 11, 1996

[30] Foreign Application Priority Data

Dec. 15, 1995 [KR] Rep. of Korea ................. 95-50613

[51] Int. Cl.$^6$ ................................................. B60R 19/02
[52] U.S. Cl. .................................. 293/150; 293/102
[58] Field of Search .......................... 293/17, 102, 117, 293/125, 150

[56] References Cited

U.S. PATENT DOCUMENTS

| | | | |
|---|---|---|---|
| 1,360,369 | 11/1920 | Cohen | 293/150 |
| 1,786,865 | 12/1930 | Reynolds | 293/150 |
| 3,820,834 | 6/1974 | Wilfert et al. | 293/150 |
| 3,823,968 | 7/1974 | Barenyi | 293/150 X |
| 4,251,096 | 2/1981 | Stock | 293/150 |

*Primary Examiner*—Joseph D. Pape
*Attorney, Agent, or Firm*—Christie, Parker & Hale, LLP

[57] ABSTRACT

A bumper system for a vehicle is installed on the front and rear of a vehicle frame. The system prevents a crash impact force from being transmitted to the vehicle body by absorbing such impact force. The system has a bumper assembly and bumper supporters or deflectors located between the bumper assembly and the frame. The bumper assembly has transverse portion and side portions. Each of the bumper supporters has a shaft portion fixed to the frame, and a supporting member pivotally mounted about the shaft. The supporting member has first and second arms which are integral to and opposite each other and support the transverse and side portions of the bumper assembly. The bumper supporters push the lateral sides of the bumper assembly outwardly by force transmitted to the bumper assembly during a collision, thereby preventing the body adjacent to the bumper assembly from being damaged.

16 Claims, 3 Drawing Sheets

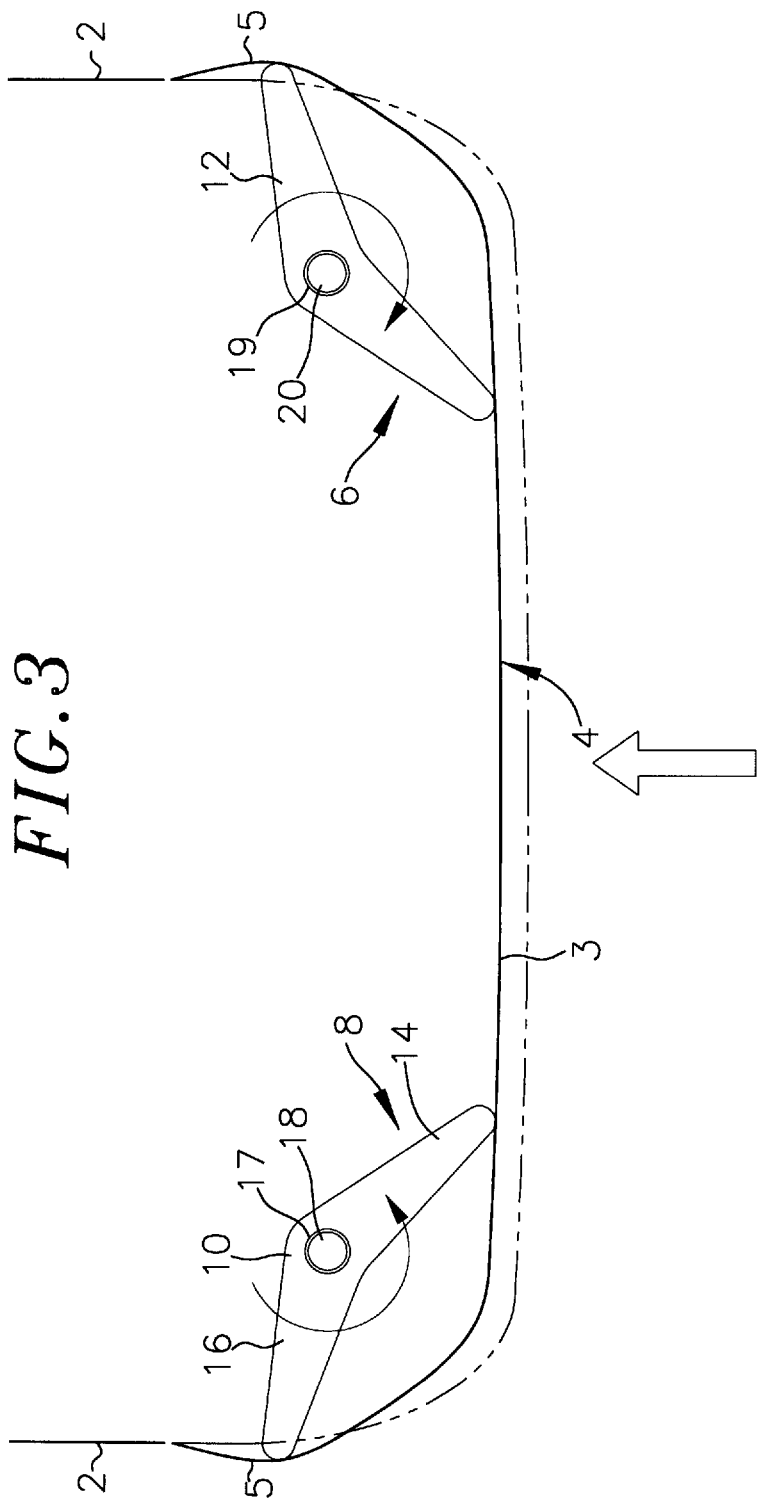

BUMPER SYSTEM FOR VEHICLES HAVING BUMPER SUPPORTERS

BACKGROUND OF THE INVENTION

The present invention relates to a bumper system for a vehicle having bumper supporters, and more particularly, to a bumper system having bumper supporters which, when experiencing a front-end or rear-end collision, protect a body of a vehicle from damage by preventing the bumper from pushing back into the body of the vehicle.

Generally, a frame of a vehicle is a basic structure on which each part of a vehicle chassis and body are mounted. The frame supports the load transmitted from the body as well as absorbs shocks, vibrations, and the like received from front and rear axles. A vehicle is subjected to bending and torsional moments, tension and compression, and vibrations resulting from ordinary driving and the weight of a vehicle. Hence, the frame of the vehicle needs to have enough strength and stiffness to endure these various loads. Moreover, it is desirable that the vehicle frame is as light as possible.

On the front and rear of the vehicle frame are installed bumpers for absorbing the impact force and protecting the body of the vehicle during a collision. The bumpers currently used on vehicles have a transverse portion and two side portions. These bumpers are typically mounted on the front and rear of the frame. The side portions of the bumpers may be mounted on the corresponding sides of the vehicle body. As such, when the vehicle experiences a front-end or a rear-end collision, the side portions of the bumper assembly which are located on the sides of the vehicle are pushed back against and over the sides of the body damaging the body. Accordingly, even if a vehicle has a bumper assembly for absorbing the impact force of the collision, the body of the vehicle is not sufficiently protected. Furthermore, to repair a body which integrated with the bumper assembly, one must repair all of the parts of the body adjacent to the bumper assembly, making the process of restoration difficult.

SUMMARY OF THE INVENTION

The present invention has been made in an effort to solve the above-mentioned problems.

The object of the present invention is to provide a bumper system having bumper supporters, also referred to as deflectors, such that when the bumpers are collided upon in a front-end or a rear-end collision, the supporters prevent the bumper assembly from being pushed back, thereby minimizing damage to a body of a vehicle.

In order to achieve this object, the present invention discloses bumper supporters, located at each corner of the bumper between the bumper and the frame. These supporters would push a side portion of the bumper assembly outwardly by the force transmitted to the bumper during a collision, thereby preventing the body adjacent to the bumper from being damaged. Each of the bumper supporters comprises a shaft portion fixed to the frame unto which is pivotally mounted a supporting member. The supporting member has a cylindrical member coupled to the shaft and has a first arm and a second arm radially extending beyond the cylindrical member. The arms the arms and the cylindrical member are integral to each other. The arms support the inner surfaces of transverse and side portions of the bumper, respectively.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 3 shows a bumper assembly, installed on a bumper supporter according to the present invention, during a collision.

DESCRIPTION

Preferred embodiments of the present invention will now be described in detail with reference to the accompanying drawings.

Figure 1:
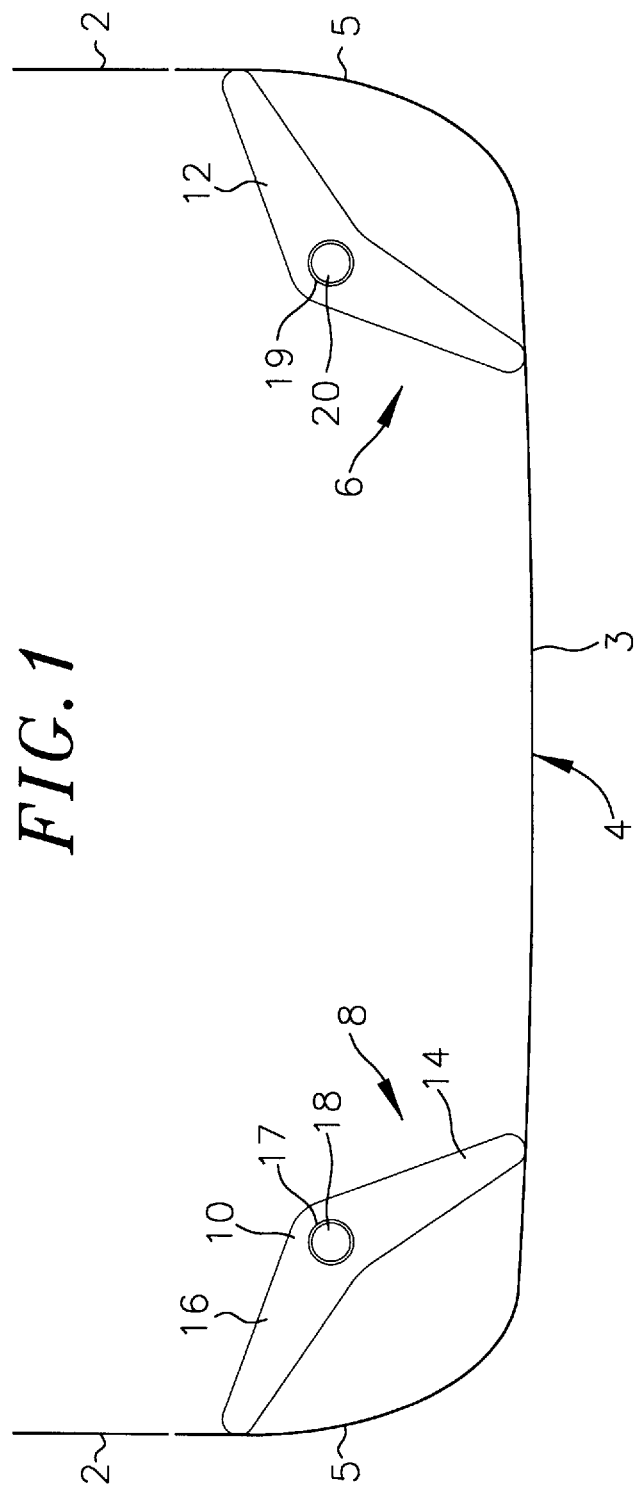
FIG. 1 is a plan view of a bumper system having bumper supporters according to the present invention.

FIG. 1 is a plan view of a bumper system for a vehicle having a bumper assembly and bumper supporters or deflectors according to the present invention. The bumper or bumper assembly 4 is installed to a front (or rear) of a vehicle body 2. The bumper assembly 4 typically has a transverse portion 3 and two lateral or side portions 5. Bumper supporters or deflectors 6 and 8 are located at each corner between the bumper assembly 4 and a frame 7 (FIG. 2) of the vehicle. These supporters prevent the bumper assembly 4 from being pushed back toward the body 2. The bumper supporters 6 and 8 each have supporting members 10 and 12, also referred to as deflecting members, each simultaneously supporting transverse portion 3 and side portion 5 inner surfaces of the bumper assembly 4. Each of the supporting members 10 and 12 has a first arm 14 for contacting the transverse portion 3 inner surface of the bumper assembly 4, and an opposite second arm 16 for contacting an inner surface of a side portion 5 of the bumper assembly 4. Arms 14, 16 of each supporting member extend from opposite sides of cylindrical member 17, 19 of the respective supporting member. The first and second arms 14, 16 extend radially beyond the cylindrical member and are bent slightly toward each other so as to be angled toward each other.

Figure 2:
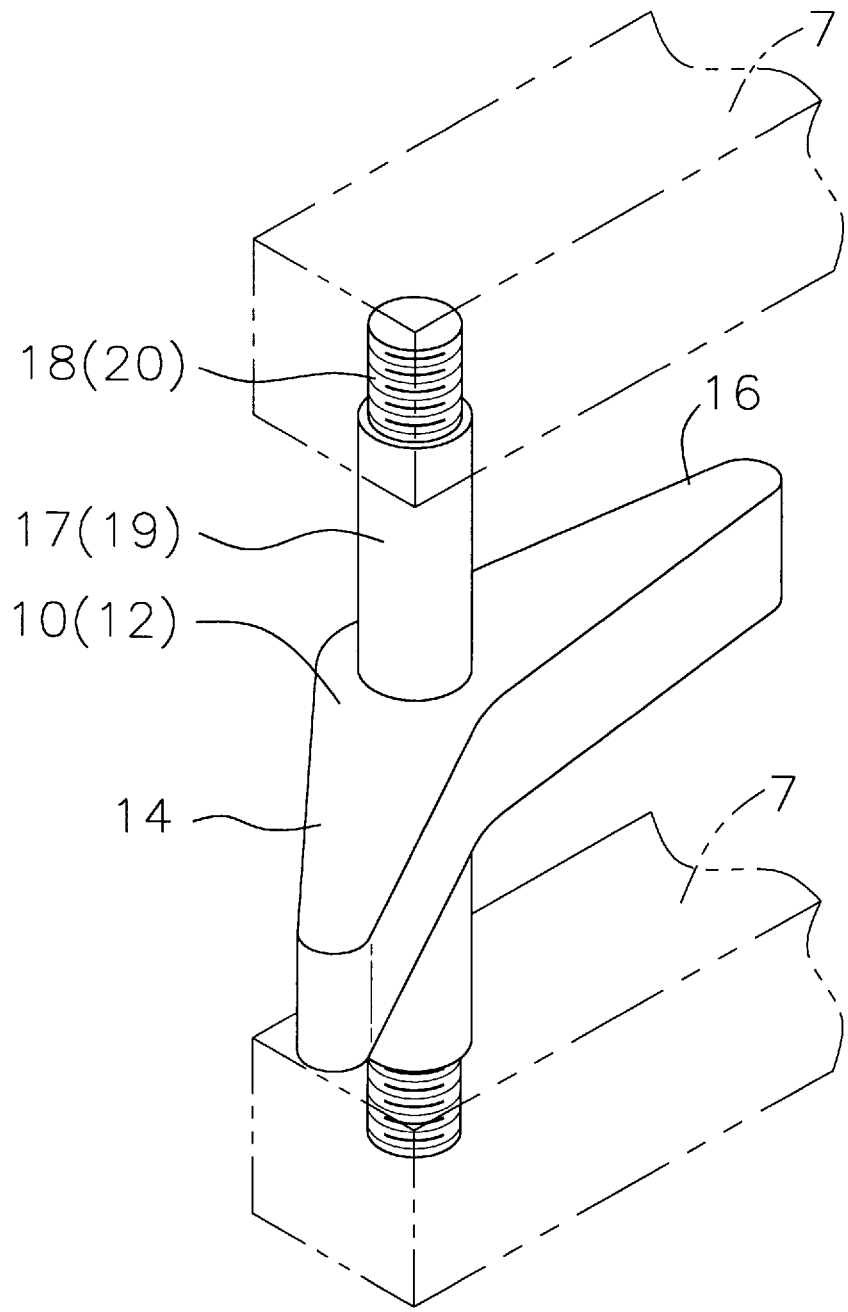
FIG. 2 is a perspective view of a bumper supporter according to the present invention.

As shown in FIG. 2, each supporter 6, 8 has a shaft 18, 20. Each shaft has two ends which extend beyond the corresponding cylindrical member. The ends of each shaft are preferably threaded or otherwise fixed to the frame. Each supporting member is able to pivot about each fixed shaft.

As shown in FIG. 3, during a front-end or a rear-end collision, each of the respective supporting members 10 and 12, associated with the bumper assembly front or rear of the vehicle body, rotates and pushes the sides of the inside of the bumper assembly 4 outwardly. The impact force acting on transverse portion 3 and the bumper assembly 4 push the first arm 14 in a direction toward the body. Each supporting member 10 and 12 rotates about the respective shaft portion 18 or 20. Accordingly, the second arm 16 of each supporting member, integrally formed with the first member 14, pushes the inside of the side portion of bumper assembly 4 outwardly. As a result, each side portion 5 of the bumper assembly 4 gives in to this force and is bent outward and is prevented from being pushed back onto the body, thus, avoiding damage to the body 2.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

I claim:

1. A bumper system in combination with a vehicle having a frame and a body, the bumper system being installed at a front or a rear of the vehicle body and preventing an impact force from transmitting to the body, the system comprising:

a bumper assembly having a transverse portion and a side extending toward the body; and a bumper supporter extending between the bumper assembly and the frame and comprising a shaft portion fixed to the frame, and a supporting member pivotally connected about the shaft portion, having first and second arms which are integrally connected to each other and contact an inner surface of the transverse portion and an inner surface of the side portion, respectively of the bumper assembly.

2. A vehicle having a bumper system comprising:

a vehicle frame;

a bumper coupled to the frame and having a transverse and a side portion; and a deflecting member mounted on the frame and positioned between the frame and the bumper for contacting the side and transverse portions of the bumper for pushing the bumper side portion outward when the transverse portion is collided upon and pushes on the deflecting member.

3. A vehicle bumper system according to claim 2 further comprising a shaft coupled to the deflecting member and to the frame.

4. A vehicle bumper system according to claim 3 wherein the shaft is fixed to the frame.

5. A vehicle bumper system according to claim 3 wherein the shaft is threaded to the frame.

6. A vehicle bumper system according to claim 3 wherein the deflecting member further comprises a cylindrical member coupled to the shaft.

7. A vehicle bumper system according to claim 6 wherein the deflecting member further comprises arms extending radially beyond the cylindrical member.

8. A vehicle bumper system according to claim 2 wherein the deflecting member further comprises:

a first arm for contacting the transverse portion of the bumper; and a second arm for contacting the side portion of the bumper.

9. A vehicle bumper system according to claim 2 wherein the deflecting member contacts the bumper.

10. A vehicle bumper deflector for deflecting a bumper having a transverse portion and a side portion, the deflector comprising:

a shaft portion for mounting the deflector to a vehicle frame; and a deflecting member pivotally mounted about the shaft portion, the deflecting member having a first and second opposing arms, the first arm for contacting the transverse portion bumper and the second arm for contacting the side portion of the bumper wherein a collision with the transverse portion of the bumper causes the deflecting member to rotate and push outwardly the side portion of the bumper restraining the side portion from contact with a body of the vehicle.

11. A deflector according to claim 10 wherein the deflecting member further comprises a cylindrical member coupled to the shaft.

12. A deflector according to claim 11 wherein the arms extend radially beyond the cylindrical member.

13. A deflector according to claim 10 wherein the first arm extends outwardly from the shaft for contacting a bumper transverse portion and wherein the second arm extends outwardly from the shaft for contacting a bumper side portion.

14. A vehicle having a bumper system comprising:

a vehicle frame;

a bumper coupled to the frame and having a transverse and a side portion;

a shaft coupled to the frame; and a deflecting member having a cylindrical member coupled to the shaft and arms extending radially beyond the cylindrical member, the deflecting member being positioned between the frame and the bumper for pushing the bumper side portion outward when the transverse portion is collided upon.

15. A vehicle bumper system comprising:

a vehicle frame;

a bumper coupled to the frame and having a transverse and a side portion; and a deflecting member comprising a first arm for contacting the transverse portion of the bumper and a second arm for contacting the side portion of the bumper, the deflector being mounted on the frame and positioned between the frame and the bumper for pushing the bumper side portion outward when the transverse portion is collided upon.

16. A bumper system in combination with a vehicle having a frame and a body, the bumper system being installed at a front or a rear side of the vehicle body and preventing an impact force from transmitting to the body, the system comprising:

a bumper assembly having a transverse portion and a side extending toward the body; and a bumper supporter extending between the bumper assembly and the frame for contacting the transverse portion and the side of the bumper assembly, the bumper supporter being adapted to push the side of the bumper assembly outwardly when a force is transmitted to the transverse portion of the bumper assembly during a collision causing the transverse portion to push on the supporter, thereby preventing a section of the bumper assembly from contacting the body of the vehicle.

* * * * *